(12) United States Patent
Wolfram

(10) Patent No.: US 6,308,985 B1
(45) Date of Patent: Oct. 30, 2001

(54) MOBILE WORK MACHINE WITH TELESCOPIC SUPPORT STRUTS

(75) Inventor: Markus Wolfram, Heubergstrasse (DE)

(73) Assignee: Putzmeister Aktiengesellschaft (DE)

( * ) Notice: Subject to any disclaimer, the term of this patent is extended or adjusted under 35 U.S.C. 154(b) by 0 days.

(21) Appl. No.: 09/486,077

(22) PCT Filed: Jul. 10, 1998

(86) PCT No.: PCT/EP98/04297

§ 371 Date: Apr. 28, 2000

§ 102(e) Date: Apr. 28, 2000

(87) PCT Pub. No.: WO99/10269

PCT Pub. Date: Mar. 4, 1999

(30) Foreign Application Priority Data

Aug. 21, 1997 (DE) .............................. 197 36 109

(51) Int. Cl.[7] ............................................... B66C 23/78
(52) U.S. Cl. ................................ 280/766.1; 280/763.1; 212/302
(58) Field of Search ..................... 280/763.1, 764.1, 280/765.1, 766.1, 124.134, 43.17, 43.23; 212/301–305

(56) References Cited

U.S. PATENT DOCUMENTS

| | | | |
|---|---|---|---|
| 3,362,544 | * | 1/1968 | Wellnitz ................................ 212/49 |
| 3,495,727 | * | 2/1970 | Long ................................... 214/138 |
| 3,985,036 | * | 10/1976 | Decker et al. ........................... 74/96 |
| 3,987,563 | * | 10/1976 | Baur ..................................... 37/73 |
| 5,638,967 | * | 6/1997 | Heckmann ........................... 212/302 |
| 5,706,960 | * | 1/1998 | Pitman et al. ........................ 212/304 |
| 5,961,145 | * | 10/1999 | Schillinger et al. ............... 280/764.1 |
| 6,092,975 | * | 7/2000 | Cannon, Jr. et al. ................ 414/563 |

* cited by examiner

*Primary Examiner*—Brian L. Johnson
*Assistant Examiner*—Tony Winner
(74) *Attorney, Agent, or Firm*—Pendorf & Cutliff

(57) ABSTRACT

A mobile work machine, especially an automatic concrete pump. The mobile work machine is arranged on a chassis (10) which has at least one preferably horizontally arranged telescopic segment (18) configured as a sliding housing, as well as a supporting strut (20) displaceable in said telescopic segment between a stowed transporting position and at least one extended position, the supporting strut supportable on the ground (28) via a foot element (26). In order to enable easy adjustment of the supporting strut width, it is proposed in accordance with the invention that the telescopic segment (18) consists of an inner segment part (44) fixed to the chassis and an outer segment part (48) which can be limitedly pivoted around an axis (46) parallel to the vertical axis of the chassis.

12 Claims, 5 Drawing Sheets

MOBILE WORK MACHINE WITH TELESCOPIC SUPPORT STRUTS

BACKGROUND OF THE INVENTION

1. Field of the Invention

The invention concerns a mobile working machine including a chassis with at least front and rear axles carrying the working machine, a preferably horizontally oriented telescope segment provided on the chassis, and a support strut moveable between a retracted transport position and at least one extended work position, and supportable on the ground via at least one preferably extendable foot part provided at the free end of the support strut.

2. Description of the Related Art

A working machine of the above-described type, designed as a mobile cement pump, is known (EP-B 0 357 988) in which two diagonally forward directed support struts are provided designed as telescoping legs, with their tubular shaped telescope segments provided on a chassis rigidly connected to a mast block, with struts slideable between a retracted transport position and an extended support position in the telescope segments which cross over each other. The diagonal telescoping struts do make it possible to set up the cement pump even in a construction area in which vehicles with front pivoting struts or telescopic pivot struts would not find room. However, the traffic conditions on the streets, and the space problem in construction areas, often do not permit a supporting stance of the support struts in full breadth perpendicular to the vehicle. It is thus frequently necessary to restrict the support breadth.

SUMMARY OF THE INVENTION

Beginning herewith, the present invention is concerned with the task of improving the known work machine in such a manner that with simple means a modification of the support breadth via the support struts is made possible.

The inventive solution is based on the concept, that in many cases which occur in the real world, in which work is accomplished on only one side of the work machine, it is desirable when the front support strut, on the side opposite to the side where work is occurring, provides support as close-in and as far in front of the driver's cabin of the vehicle chassis as possible, with the object of maximizing the forward tip-axis. In order to achieve this, it is proposed in accordance with the invention that the telescopic segment is comprised of a chassis-fixed inner segment part and an outer segment part which, with respect to the inner segment part, is limitedly pivotable about a pivot axis which is parallel to the vehicle vertical axis. When the support strut is in its retracted transport position, then the transport segment is engaged over its entire length, so that the outer segment part cannot be rotated. When, on the other hand, the support strut is in its extended supporting position, then the support strut is held only by the outer, rotatable segment part. In this situation, the segment part together with the support strut can be pivoted up to the vehicle chassis.

An advantageous embodiment of the invention envisions that the outer segment part together with the pivot axis is provided on a carrier limitedly displaceable relative to the vehicle chassis perpendicular to the vehicle longitudinal axis. The carrier is preferably comprised of a guided part guided in a displacement guide perpendicular to the vehicle longitudinal axis and a pivot part carrying the outer segment part and pivotable about the pivot axis with respect to the guide part. Thereby it is achieved, that the pivot axis can be extended to laterally projecting beyond the vehicle chassis, so that the support strut can be pivoted up to the edge of the vehicle chassis without obstacle.

An advantageous design of the invention envisions that the vehicle-fixed segment part is provided at an interval behind the front axle or driver cabin of the vehicle chassis and, on the extension or projection side, is directed diagonally in the direction of the forward axle or driver cabin. For facilitating the construction and for improvement of the pivot kinematics it has been found advantageous that the pivot axis be displaced laterally, with respect to the outer segment part, in the direction of the front axle.

An enlargement of the extension breadth or stance can be achieved when the support strut is comprised of at least two telescopic parts, of which the outer part carries the foot part.

A further preferred embodiment of the invention envisions that two telescope segments for receiving respectively one support strut, directed towards opposing sides of the vehicle chassis, are provided with their inner segment parts crossing over the vehicle chassis longitudinal axis in different planes or levels.

According to a further advantageous embodiment, the segment parts of the telescopic segment and the support struts are curved arc-like. Thereby the telescope segment can cross perpendicularly over the vehicle chassis longitudinal axis behind the front axle or a driver cabin and, on the extension side, be directed diagonally outwards in the direction of the front axle or driver cabin. An alternative embodiment envisions that the arc-shaped curved telescope segment is directed tangential to the vehicle longitudinal axis and is aimed in the extension direction diagonally laterally outwardly.

In order to provide a stable supporting, it is advantageous when a locking mechanism such as a bolt 49 is provided for locking the outer segment part in at least one predetermined angular position against rotation about its pivot axis.

BRIEF DESCRIPTION OF THE DRAWINGS

In the following, the invention will be described in greater detail on the basis of an embodiment shown in the drawings in schematic form. There is shown.

DETAILED DESCRIPTION OF THE INVENTION

Figure 1:
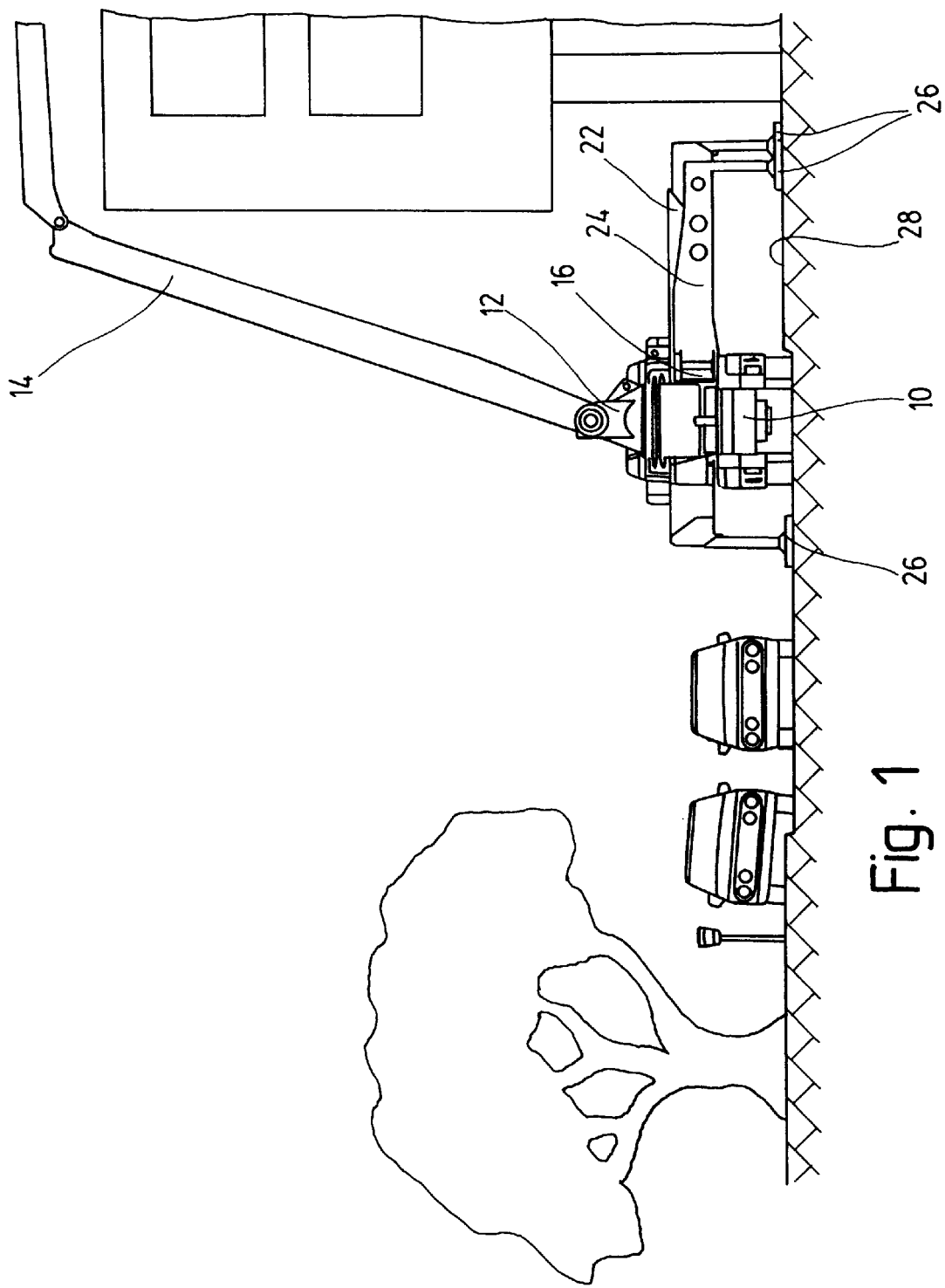
FIG. 1 a view of a mobile cement pump positioned on the side of a road with close-in support struts provided on the street side.
Figure 2:
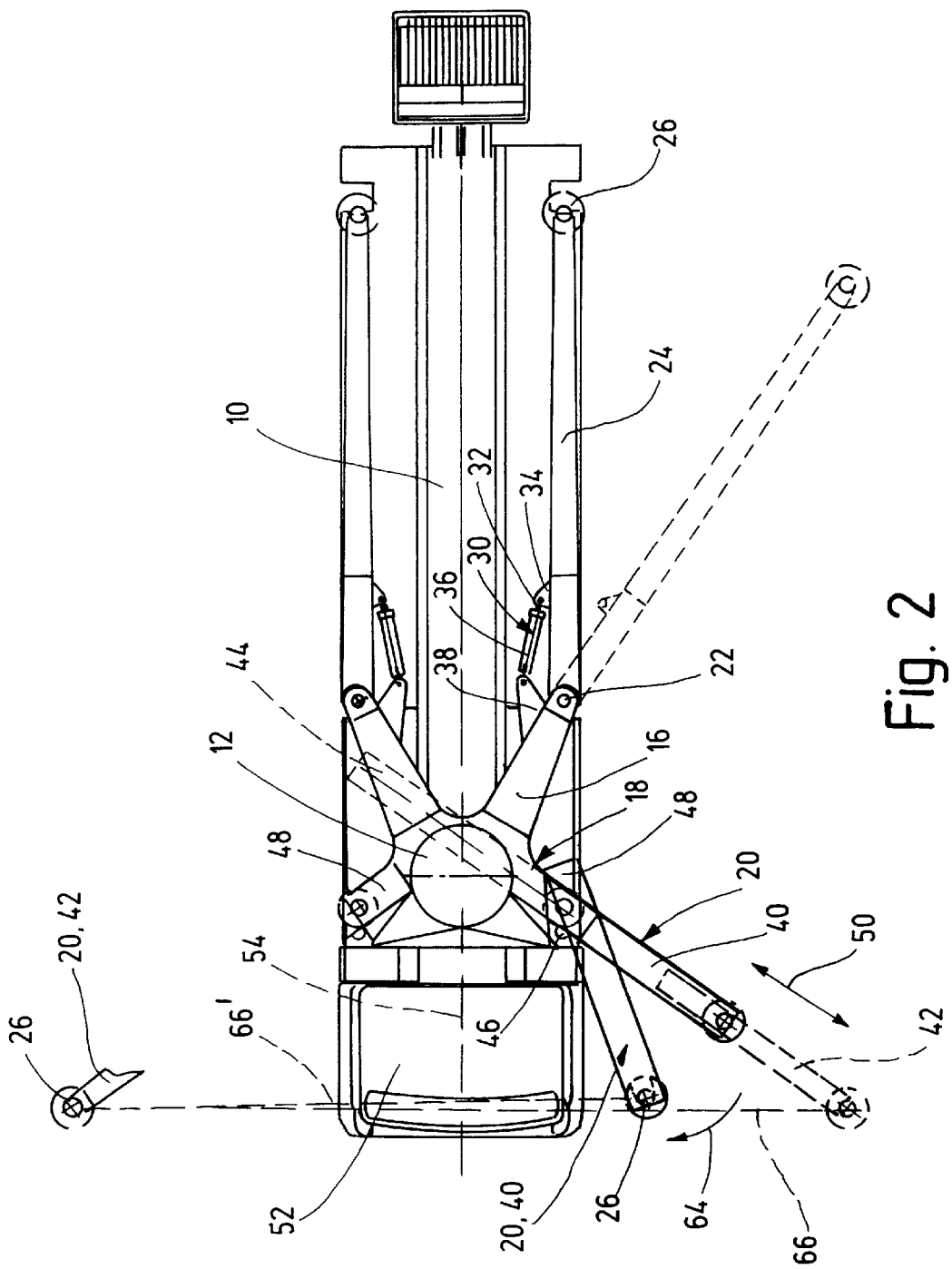
FIG. 2 a top view of a chassis with diagonally telescopic support struts which can be positioned for wide or close-in support.

The mobile cement pump shown in FIG. 1 and FIG. 2 is comprised essentially of a multi-axle chassis 10, a cement supply mast 14 mounted rotatably about a vertical axis on a mast block 10 near a front axle, and a support structure, which includes a chassis-fixed support frame 16, two front support struts displaceable in respectively one telescope segment 18 formed as a guide box on the support frame 16 and two rear support struts 24 pivotal about a vertical axis 22. The support struts 20, 24 are supportable on the ground 28 with respectively one downwardly extendable foot part 26. A hydraulic work cylinder 30 is provided for pivoting of the rear support strut 24, of which the piston rod 32 is linked to linkage point 34 on the support strut side and the cylinder part 36 is linked to the vehicle chassis at linkage point 38.

The forward support struts 20 are comprised in all illustrative embodiments of two telescopic parts 40, 42, of which the inner strut part 40 is guided in telescope segment 18 and the outer strut part 42 is guided in the strut part 40 and is designed as a telescope tube and on its free end carries the foot part 26.

Figure 3:
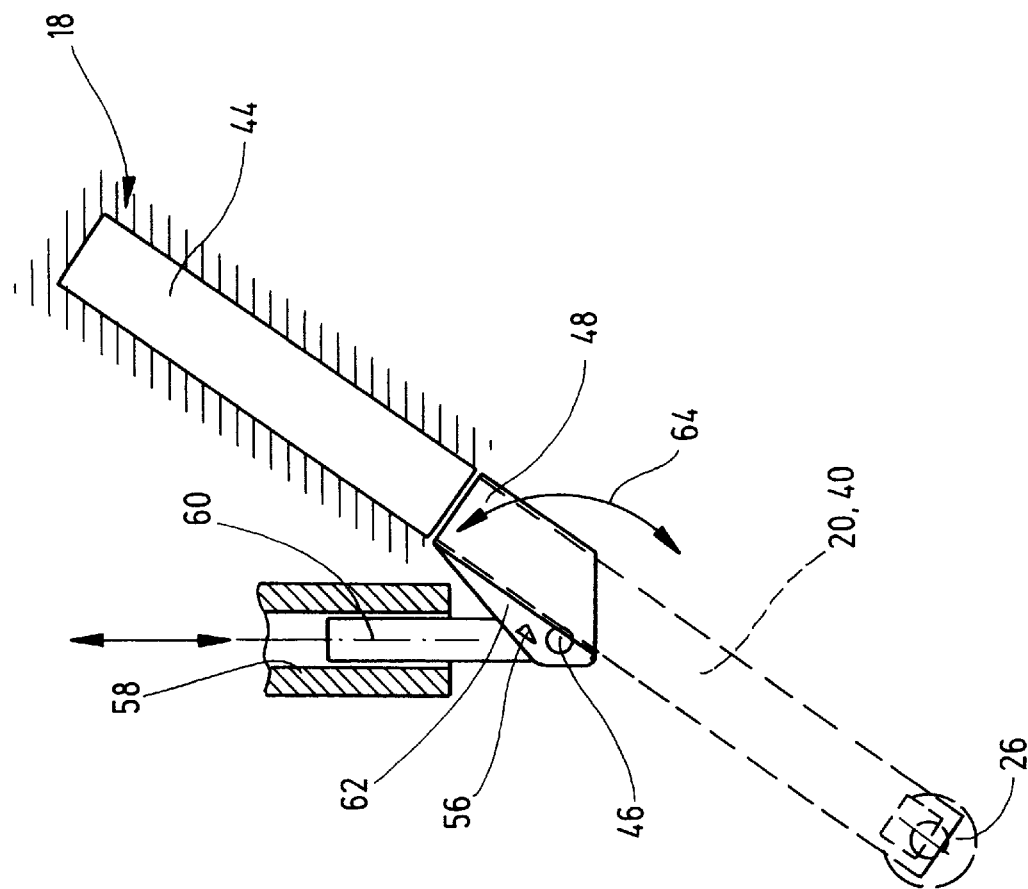
FIG. 3 a detailed representation of the support strut of the cement pump according to FIG. 1.

In order to make possible a selective close-in supporting or a wide-stance supporting, the telescope segment 18 is comprised of a vehicle chassis-fixed inner segment part 44 and an outer segment part 48 which, with respect thereto, is limitedly pivotal about a pivot axis 46 which is parallel to the vertical axis of the vehicle. In the transport position, wherein the support strut 20 is retracted into the telescope section, the linkage 46 is blocked, while in the extended support position it is released for pivoting of the support strut 20. For broad-stance supporting, support strut 20 is telescoped in the direction of the double arrow 50, without pivoting the outer segment part 48 about the pivot axis 46. For close in supporting, the support strut 20 displaced out of the telescope segment 18 into its support position together with the outer segment 48 can be pivoted about the pivot axis 46 in the direction of the driver cabin 52 of the vehicle chassis. In order to avoid obstructions when so doing, it is advantageous when in accordance with FIG. 3 the outer segment part 48 together with the pivot axle 46 are provided upon a carrier 56 limitedly displaceable perpendicularly to the vehicle chassis longitudinal axis 54 relative to the vehicle chassis 10. In the shown illustrative embodiment, the carrier includes a displacement guide 58 guided in guide part 60 perpendicular to the vehicle chassis longitudinal axis 54 and a pivot part 62 bearing the outer segment part 48 and pivotal with respect to the guide part 60 about the pivot axis 46.

Figure 4:
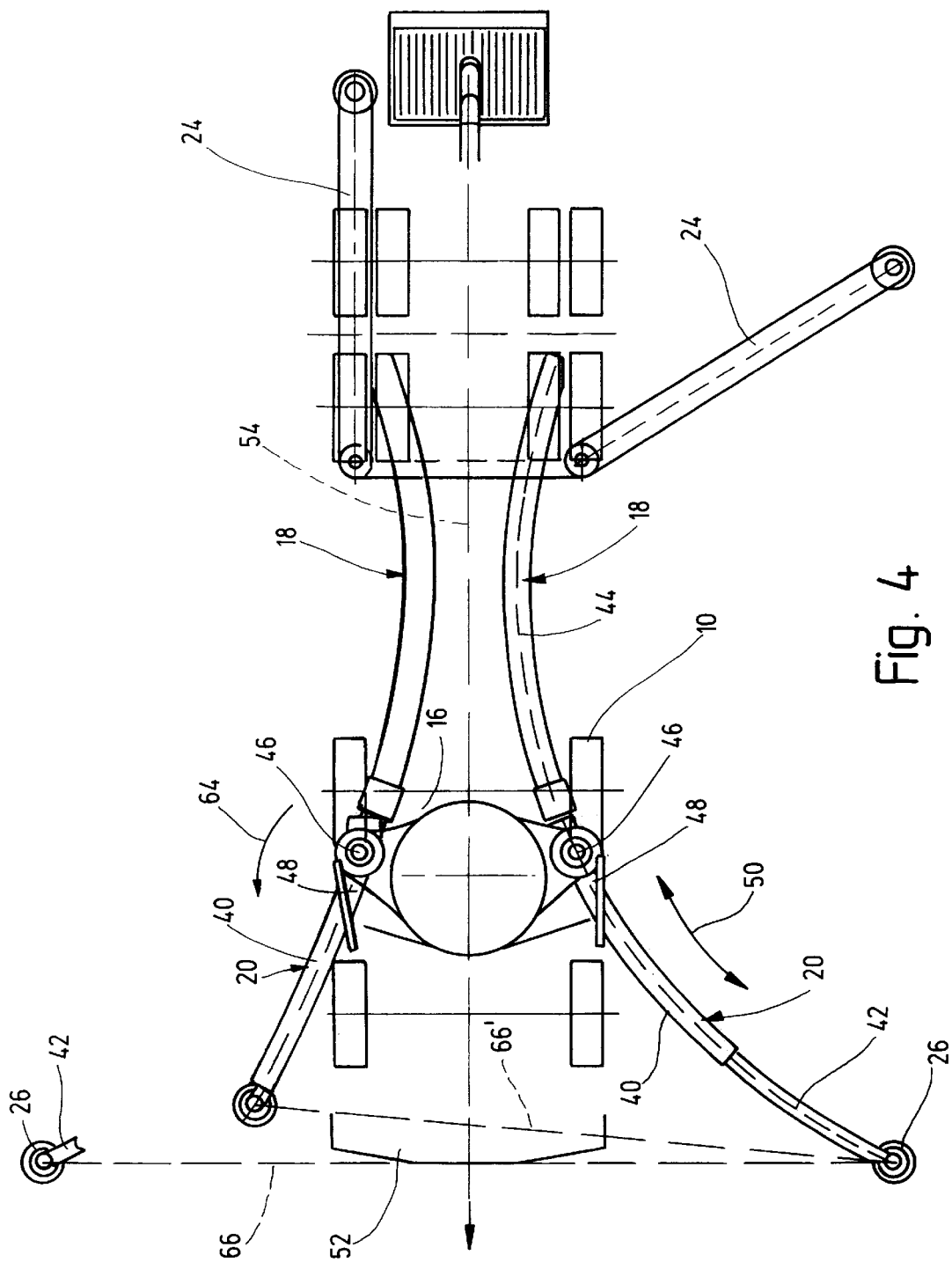
FIG. 4 a top view of a vehicle chassis of a cement pump with arc-shaped telescopic support struts for close-in and wide support.

In the illustrative embodiment shown in FIG. 4, the telescope segment 18 and the front support strut 20 are curved arc-like and, in the central area of the vehicle chassis 10, are oriented tangentially to the vehicle chassis longitudinal axis 54. The front support struts 20 are here also designed to be telescopic, while the telescope segment 18 includes a chassis-fixed inner segment part 44 and an outer segment part 48 pivotal about the pivot axis 46. In the wide supporting position (lower part of FIG. 4) the telescopic support strut 20 is extended in the direction of the double arrow 50 without pivoting of the outer segment part 48. For close-in supporting (FIG. 4, top) first the inner strut part 40 of the support strut 20 is displaced outward out of the telescope segment 18 and thereafter, together with the outer segment part 48, is pivoted about the pivot axis 46 in the direction of the arrow 64.

Figure 5A:
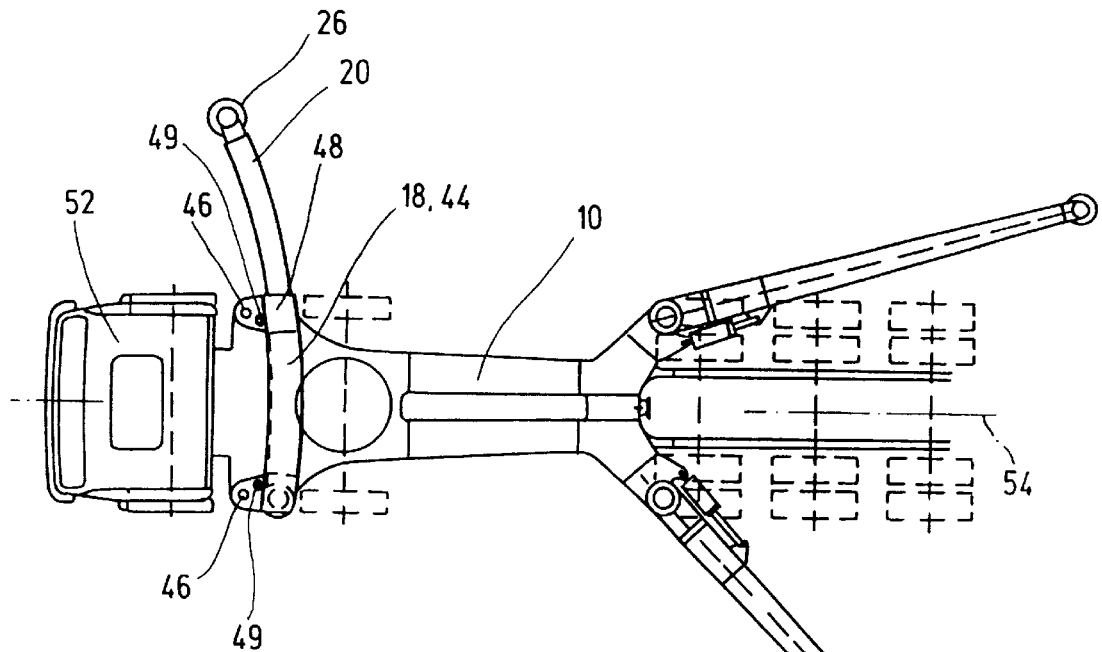
FIG. 5a and b a top view upon a vehicle chassis of a vehicle cement pump with arc-shaped bowed telescopic front support struts for the close-in and wide supporting in two different extension positions.
Figure 5B:
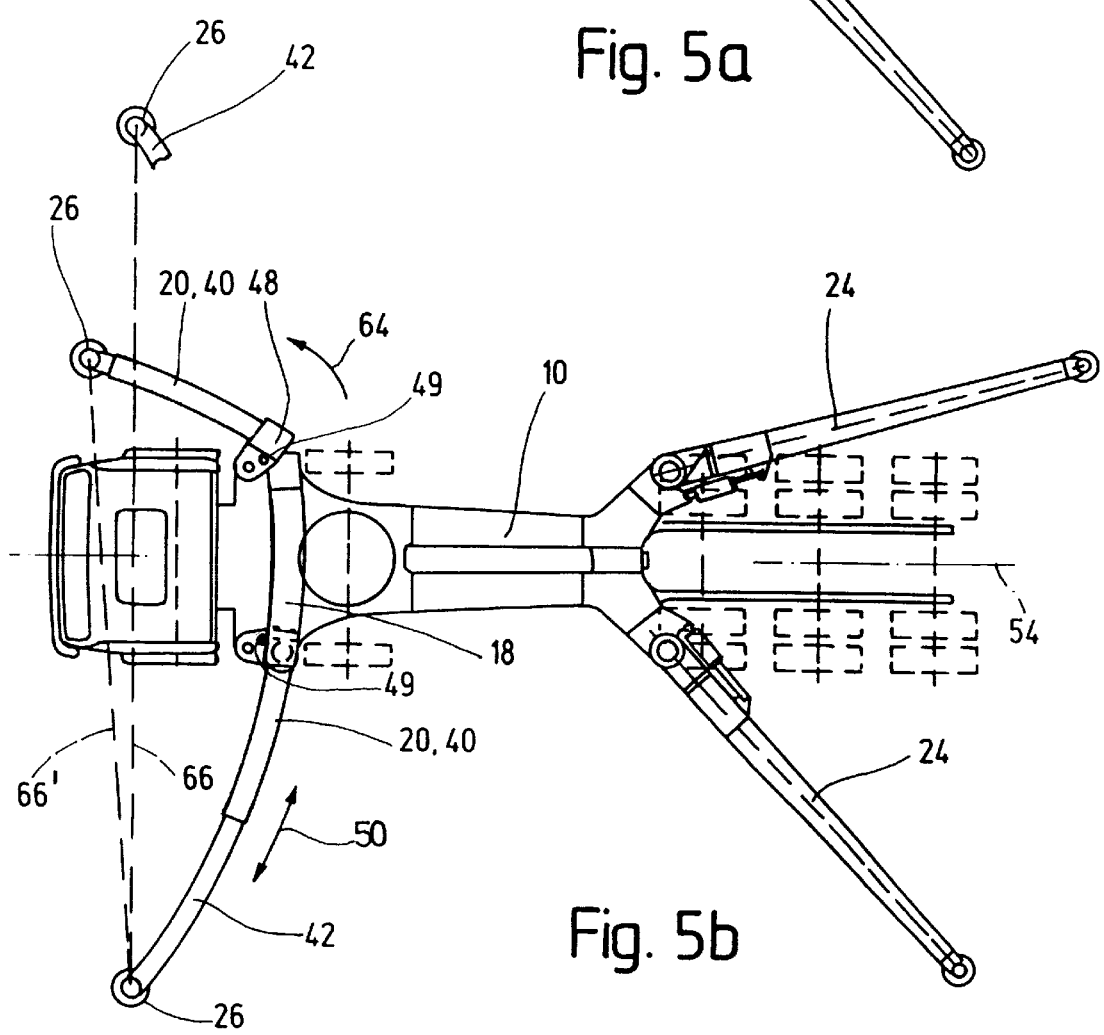

In the illustrative embodiment shown in FIG. 5a and b, the arc-shaped bowed forward-curved telescope segments 18 are provided transversely to the vehicle longitudinal axis 54 in different planes or levels of the vehicle chassis. The telescope segments are here likewise provided divided or segmented into respectively one chassis-fixed inner segment part 44 and one outward segment part 48 pivotal with respect to the vehicle chassis about a vertical pivot linkage axis 46. The arc-shaped bowed telescopic support struts 20 are, in their transport position, completely retracted into the telescope segment 18 which is designed as a discharge or outlet guide box (FIG. 5a, bottom). For wide-stance support, the support struts 20 are telescoped in the direction of the double arrow 50 into their support position shown in FIG. 5b, bottom. For the close-in support position, the appropriate support 20 is extended from the telescope segment 18 without telescoping and, together with the outer segment part 48, is pivoted about the pivot or linkage axis 46 in the direction of the arrow 64 against the vehicle chassis.

In FIGS. 2, 4, and 5 the tip-axis of the respective support points are indicated by dashed lines 66, 66'.

In summary, the following can be concluded: The invention relates to a mobile work machine, especially an automatic concrete pump. The mobile work machine is arranged on a chassis 10 which has at least one preferably horizontally arranged telescopic segment 18 configured as a sliding housing, as well as a supporting strut 20 displaceable in said telescopic segment between a stowed transporting position and at least one extended position, the supporting strut supportable on the ground 28 via a foot element 26. In order to enable easy adjustment of the supporting strut width, it is proposed in accordance with the invention that the telescopic segment 18 consists of an inner segment part 44 fixed to the chassis and an outer segment part 48 which can be limitedly pivoted around an axis 46 parallel to the vertical axis of the chassis.

What is claimed is:

1. A mobile work machine with a vehicle chassis (10) including:
    at least one front axle and one rear axle mounted on said vehicle chassis,
    at least one telescope segment (18) provided on the vehicle chassis, and
    a support strut (20) displaceable in the telescope segment (18) between a retracted transport position and at least one extended support position and supportable on the ground via a foot part (26) provided on its free end,
    wherein said vehicle chassis has a vertical axis, and
    wherein the telescope segment (18) includes an inner segment part (44) fixed to the vehicle chassis and an outer segment part (48) mounted for limited pivotal movement with respect to the chassis about a pivot linkage axis (46) which axis is parallel to the vehicle chassis vertical axis.

2. A work machine according to claim 1, wherein said vehicle chassis has a longitudinal axis, and
    wherein the outer segment part (48) together with the pivot linkage (46) are provided on a carrier (56), said carrier mounted for limited displacement relative to the vehicle chassis perpendicularly to the vehicle chassis longitudinal axis (54).

3. A work machine according to claim 2, wherein the carrier includes a guide part (60) guided in a displacement guide (58) perpendicularly to the vehicle chassis longitudinal axis (54), and an outer segment part (48) carrying pivot part (62) pivotal with respect to the guide part (60) about a pivot axis (46).

4. A work machine according to claim 1, wherein a driver cab (52) is provided on said chassis, wherein said chassis has a longitudinal axis, and wherein the vehicle chassis fixed inner segment part (44) has one opening and is provided spaced apart behind the front axle or behind the driver cab (52) of the vehicle chassis, and has its opening directed diagonally to the vehicle chassis longitudinal axis and in the direction of the front axle or driver cab.

5. A work machine according to claim 4, wherein the outer segment part (48) together with the support strut (20), when in their extended position, are pivotal in the direction of the front axle against the vehicle chassis (10).

6. A work machine according to claim 4, wherein the pivot axis (46) for the outer segment part (48) is set-off laterally in the direction of the front axle.

7. A work machine according to claim 1, wherein the support strut (20) is comprised of at least one inner and one outer telescopic parts (40, 42), of which the outer support strut part (42) carries the foot part (26).

8. A work machine according to claim 4, wherein two telescope segments (18) are provided for receiving respectively one support strut (20), said two telescope segments being directed towards opposite sides of the vehicle chassis (10), and crossing over the vehicle chassis longitudinal axis (54) in different levels.

9. A work machine according to claim 1, wherein the inner and outer segment parts (44, 48) of the telescope segment (18) and the support struts (20) are curved arc-like.

10. A work machine according to claim 9, said machine including a driver cabin (52), wherein said vehicle chassis has a longitudinal axis, and wherein the telescope segment (18) crosses over the vehicle chassis longitudinal axis (54) behind the front axle or the driver cabin (52), with an opening directed diagonally to the vehicle longitudinal axis and in the direction of the front axle or driver cabin.

11. A work machine according to claim 9, wherein the telescope segment (18) is oriented tangentially to the vehicle longitudinal axis (54) and, on the opening side, is directed diagonally to the vehicle longitudinal axis laterally towards the outside.

12. A work machine according to claim 1, further including a locking mechanism (49) for locking the outer segment part (48) in at least one predetermined angular position against pivoting about the linkage axis (46).

* * * * *